Nov. 15, 1949  H. T. BOGLE  2,487,786
SUBMERGIBLE FUEL CELL
Filed Jan. 23, 1945  2 Sheets-Sheet 1
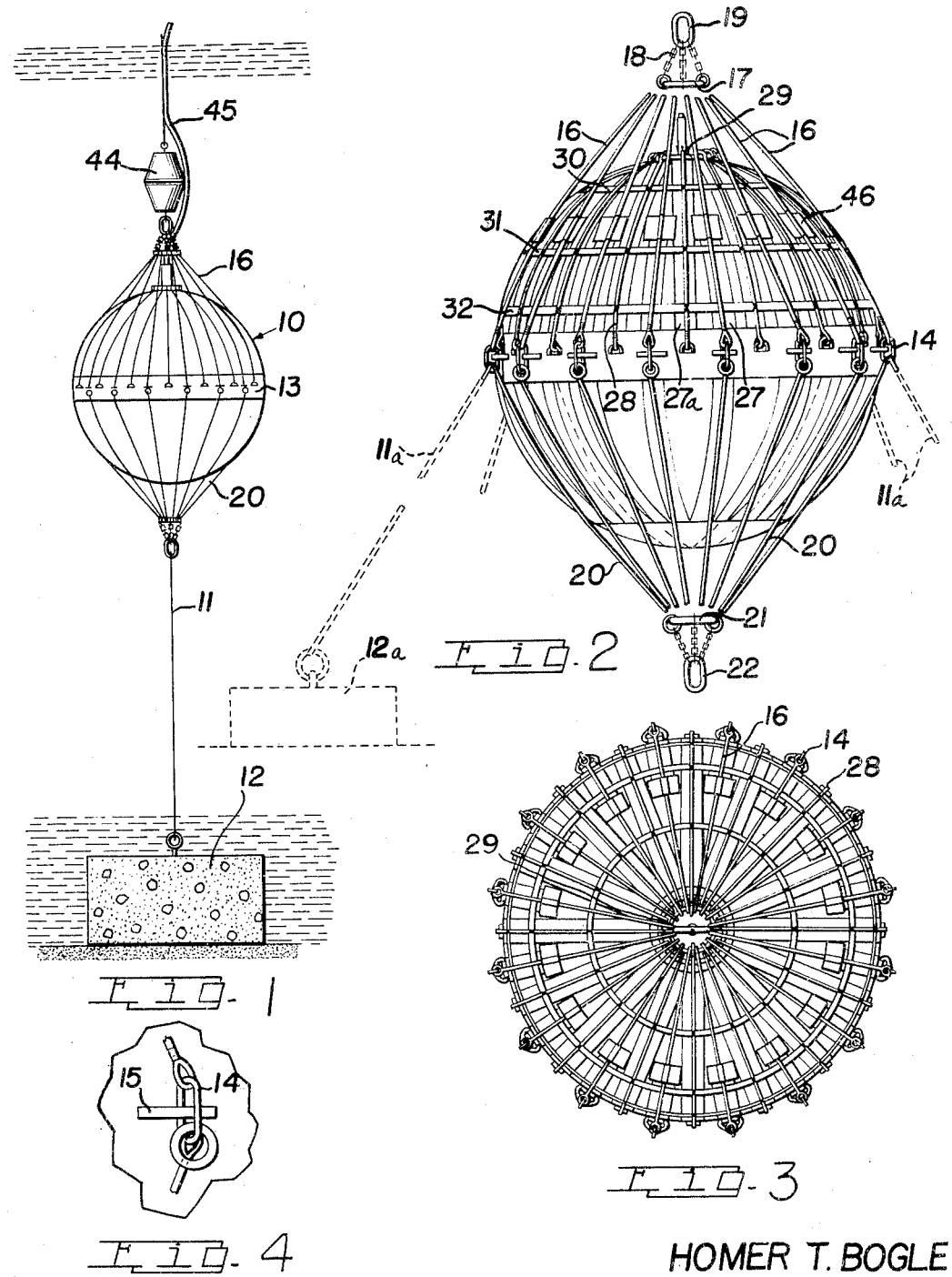
HOMER T. BOGLE
BY
ATTORNEY Nov. 15, 1949    H. T. BOGLE    2,487,786
SUBMERGIBLE FUEL CELL
Filed Jan. 23, 1945    2 Sheets-Sheet 2
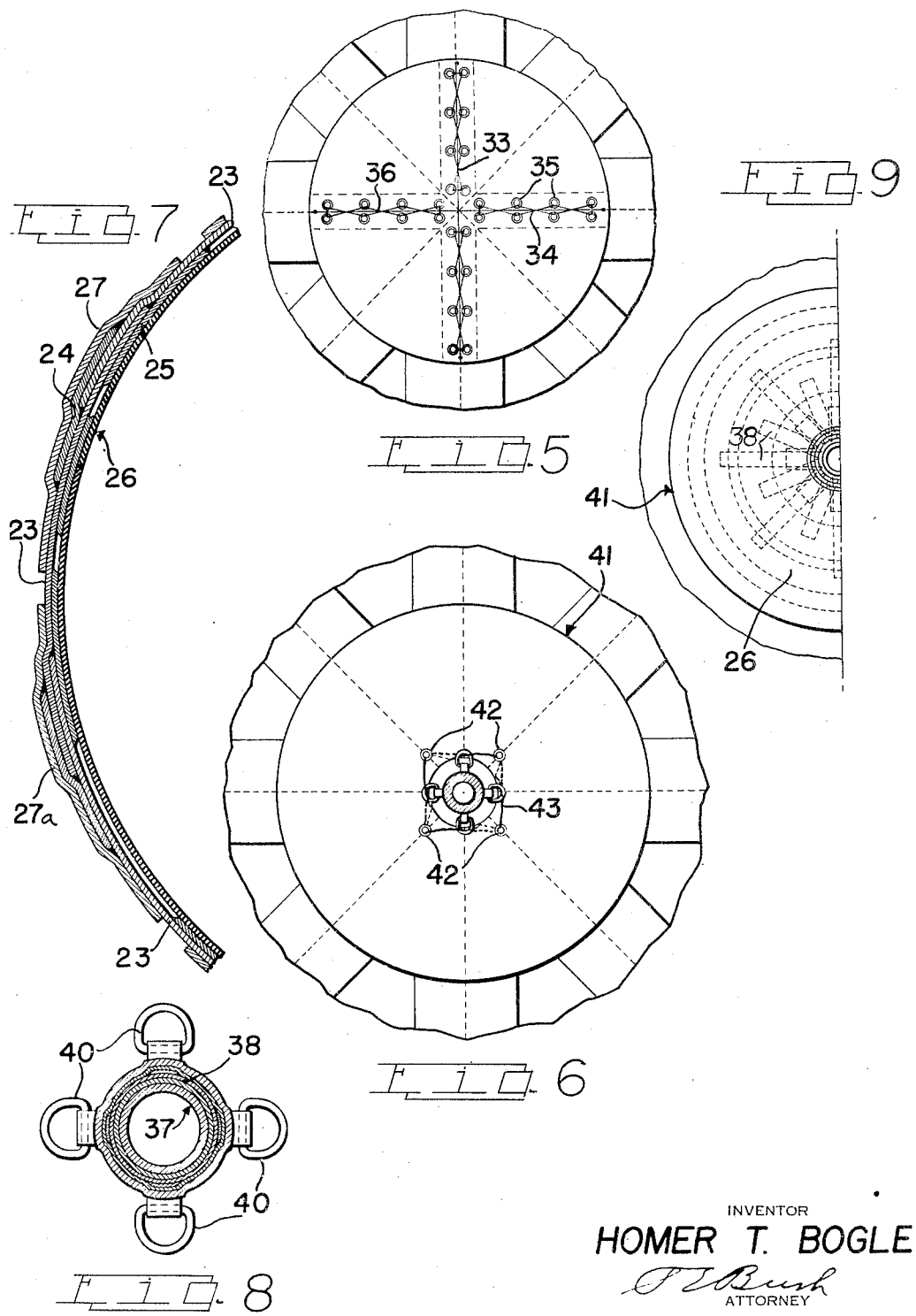
INVENTOR
HOMER T. BOGLE
ATTORNEY Patented Nov. 15, 1949

2,487,786

UNITED STATES PATENT OFFICE 2,487,786

SUBMERGIBLE FUEL CELL

Homer T. Bogle, United States Navy

Application January 23, 1945, Serial No. 574,174

7 Claims. (Cl. 114—.5)

(Granted under the act of March 3, 1883, as amended April 30, 1928; 370 O. G. 757)

This invention relates to submergible marine fuel storage tanks and has for an object to provide an improved method of storing liquid fuel.

The problem of extending the range of marine air and surface craft at sea is of great importance especially during wartime and it is the purpose of the present invention to provide an improved portable refueling depot which may readily be established wherever desired and by means of which refueling operations may be accomplished in a minimum amount of time.

The limitations attendant to refueling small craft from a single tanker or supply station have long been known and it has been proposed to distribute such fuel in portable containers in small areas or fields, the fuel being retained in a number of floating cells or tanks whereby a large number of craft can be refueled simultaneously by separate cells at points throughout a refueling field.

An objection to such refueling containers in the form of floating cells or buoys which ride upon the surface of the water is however apparent as they present an obvious target to the enemy. Also they require the use of a pump or other separate means for delivering fuel from the cell, which means is cumbersome and, in many instances unavailable.

It is therefore an object of the present invention to provide a portable collapsible refueling cell which may be deeply submerged for concealment but from which fuel may readily be withdrawn while so concealed.

An additional object is to provide a submergible fuel cell which may employ the hydrostatic pressure existing at a depth for the purpose of expelling fuel from the cell and delivering it through a fuel line, to a point above the surface of the water.

Another object is to provide a refueling container which is durable, capable of storage in extremely compact form, adapted for use with the conventional shipboard cargo handling cranes and equipment and may readily be filled with fuel either before or after it has been anchored at the selected refueling location.

Another object is to provide a submergible fuel container wherein the fuel when stored has a minimum of air space in contact with the fuel whereby the amount of moisture deposited in the fuel as a condensation product is reduced to a minimum.

It is also an object to provide a collapsible fuel container which will occupy a minimum amount of space when deflated for storage but which in use has reenforcing straps and supporting cables so arranged as to provide a tank having maximum inherent strength.

A further object of the present invention is to provide a novel means for reenforcing and suspending a flexible fuel container wherein the fuel enveloped is retained in a substantially spherical body but without the use of rigid bracing or reenforcing members.

Still another object of the present invention is to provide new and improved anchoring means for marine fuel containers of the character described, which anchoring means may readily be modified to permit its adaptation to circumstances at the anchorage, which will retain the tank immersed at any desired depth and which will permit satisfactory refueling operations therefrom while submerged.

Still another object is to provide a flexible fuel tank harness including vertically and transversely disposed members arranged to permit fuel tank supporting and restraining action when in use in the field, and to permit the entire strain of the anchor device to be transmitted through said harness for fuel field laying purposes when the tank is being installed or removed from a fuel field by means of an overhead crane or the like.

Additional objects and improvements will be apparent in the details of the cell harness construction, the manner of attaching the fuel outlet coupling, and the particulars of the inner and outer fuel bag construction, all as set forth herein.

In the drawings:

Fig. 1 is a side elevation of a submerged fuel cell secured by a single anchor;

Fig. 2 is an enlarged view of the embodiment illustrated in Fig. 1 showing in dotted lines an alternative method of anchoring the cell;

Fig. 3 is a top plan view of the embodiment illustrated in Fig. 2;

Fig. 4 is an enlarged view of the anchor engaging means for installing the alternative anchors of Fig. 2;

Fig. 5 is an enlarged detailed view of the bottom of a cell;

Fig. 6 is an enlarged detailed view of the top of a cell;

Fig. 7 is an enlarged horizontal cross-section through the cell wall showing the details of the wall construction;

Fig. 8 is an enlarged horizontal cross-section through a portion of the fuel outlet nozzle; and Fig. 9 is a view similar to Fig. 6 but showing the radially extending nozzle reenforcing straps in dotted lines.

Referring to the drawings in detail the embodiment illustrated comprises a collapsible fabric fuel cell which may be conveniently anchored at any desired depth by the use of suitable anchoring means. The anchor line 11 may be secured to a single anchor 12 which may comprise a block of concrete or the like as shown in Fig. 1 or if desired an alternate means may be employed for anchoring the fuel cell wherein a plurality of smaller, radially disposed anchors may be positioned about the fuel cell and may be secured to a cell encompassing girdle as indicated by the dotted line construction shown in Fig. 2.

The cell encircling girdle 13 may be provided with anchor links 14 (Fig. 4) secured by a reenforced loop 15. These anchor links may be employed for securing to the cell upwardly extending lift lines 16 gathered together at the top and secured to an upper circular collector ring 17 in the manner shown. The ring 17, through connecting chains 18, is connected to a lift ring 19 to which a suitable lifting line may be secured.

In the construction of Fig. 2 a plurality of anchor lines 11a may be disposed about the cell in which case the individual anchors may be lighter and consequently easier to handle.

The upwardly extending lift lines 16 just described are duplicated over the lower part cell in the form of downwardly extending anchor lines 20 which are joined to a lower circular collector ring 21 which in turn is connected by chains to an anchor ring 22.

It will be noted that with this construction any force exerted by the lift lines and opposed by the anchor lines is not transmitted to the fabric constituting the cell wall and that fabric is therefore not subjected to strains.

In addition to the above described special lift and anchor harness the present embodiment provides a multiple layer fuel cell constructed of impervious flexible material and capable of being supported by the liquid within which it is immersed in order to relieve the fabric of the strain of supporting its contents.

As shown in Fig. 7, the cell wall construction is preferably formed of a layer or layers of fabric 23, such as for example, as 17 ounce cotton duck. The members 23 may be overlapped, as shown, and reenforced outside by reenforcing strips 24 and inside by reenforcing strips 25.

The liner which is employed to contain the liquid fuel in storage may comprise a bag 26 of one or more layers of impervious synthetic gum material, such as one of the butadiene artificial rubbers of known resistance to deterioration by the usual fuels and particularly fuels containing aromatic hydrocarbons. The outside of the cell may be provided with strips 27 and 27a spaced and positioned as shown, so as effectively to cover and protect the overlapping joints above described and also serve as abrasion strips.

In order to maintain the cell in a substantially spherical shape during normal use suitable separate strain relieving contour lines 28 may extend from the girdle 13 to the top of the cell where they are joined to an outlet nozzle encircling ring 29.

The reenforcing tapes 27 and 27a may be suitably spaced on the outer covering of the spherical cell surface so that they lie under the upwardly extending lift lines 16, and the strain relieving contour lines 28 as shown.

It will be apparent that the cell may be protected against chafing by the lines 16 through the use of the reenforcing abrasion strips 27. Reenforcing strips 27a provide a similar protection from chafing by the strain relieving lines 28. It will be noted that the reenforcing strips for the strain relieving contour lines need not extend below the girdle 13.

Suitable cell encircling bands 30, 31 and 32 may be provided, as shown, to which the strain relieving contour lines 28 are secured at intervals.

It will be obvious that when immersed the cell will have a tendency to rise, in as much as liquid hydrocarbons have a specific gravity less than that of the water in which they are immersed. This hydrostatic head may be employed to forcibly expel the contents of the cell to a point considerably above the surface of the water and by which means air and surface craft may be refueled without the use of a pump or separate means for raising the fuel. During emptying of the cell the lower portion being under greater pressure will tend gradually to be collapsed by the hydrostatic head and the fuel forced upwardly from the cell. It will be noted that by the present construction wherein the upper portion of the cell is reenforced by the upwardly extending strain relieving contour lines 28 and interconnecting cell encircling bands 30, 31 and 32, there is no tendency for the upper part of the cell to be distorted out of shape.

As shown in Fig. 5 the bottom of the cell may be provided with an access opening formed by intersecting slits 33 and 34 in the fabric cell wall 23. Reenforced openings 35 may be disposed at intervals along these slits and lacings 36 may be threaded through the reenforced openings and secured to normally keep the cell closed and the liner in place.

By the above construction it will be apparent that access may readily be gained to the interior of the cell whereby the liner 26 may readily be removed, inspected and replaced, or if desired, an entire new liner may readily be inserted to replace the defective one.

Figs. 6, 8 and 9 show details of the construction of the filling and discharge nozzle which is integrally secured to the inner liner 26. A nozzle liner 37 may be surrounded by a plurality of suitable reenforcing layers shown generally at 38. These may be secured to the cell wall 26 in any suitable manner, as for example in Fig. 9 the radially extending portions 38 spread over and are secured to the inner liner 26 to provide the maximum strength for the outlet nozzle.

The nozzle may have radially disposed D rings 40 secured to its outer surface and the cover 23 may have a nozzle encircling reenforcement 41 provided with spaced reenforced openings 42. A lacing 43 may be threaded alternately through an opening 42 and a D ring 40 in the manner shown in Fig. 6.

If desired the cell may be retained in an upright position by means of a suitable buoy 44 as shown in Fig. 1 and the outlet hose 45 leading from the nozzle may be secured as shown.

Guide patches 46 may be used to loosely retain the lift lines 16 adjacent the cell wall.

From the foregoing description it will be apparent to those skilled in the art that various modifications thereof may be made without departing from the spirit and scope of this invention and it is desired, therefore, that the same be limited only by the scope of the prior art and the appended claims.

The invention described herein may be manufactured and used by or for the Government of the United States of America for governmental purposes without the payment of any royalties thereon or therefor.

Having thus described the invention, what is claimed and desired to be secured by Letters Patent is:

1. A fuel cell for use in submerged refueling stations comprising, an inner liner of flexible sheet material substantially impervious to hydrocarbon fuels, an outer enclosure of flexible material, a cell encircling band, means for maintaining the cell in a substantially spherical shape while submerged comprising a plurality of strain relieving lines secure to the band and extending from the sides of the cell to the top thereof, a harness for hoisting and anchoring the cell comprising a plurality of upwardly and downwardly extending anchor lines secured to the band intermediate their ends, and collector rings above and below the cell to which the ends of the anchor lines are secured.

2. A flexible fuel cell for use in submerged refueling stations having a flexible inner liner of a sheet material and an outer cover of flexible material comprising an outer cover formed of fabric strips secured together to form a cell, means for maintaining the cell in shape while submerged including a plurality of strain relieving lines extending from the sides of the cell at a point substantially on a plane intersecting the center of said cell and to the top of said cell, the lines being attached to the outer cover at intervals, a harness for hoisting and anchoring the cell comprising a plurality of upwardly extending anchor lines secured to the outer covering intermediate their ends, and collector rings above and below the cell to which the ends of the anchor lines are secured.

3. A submersible fuel cell comprising, an inner imperforate liner having a fuel outlet for fuel delivery therefrom while submerged, a relatively strong outer casing enveloping the liner and imparting shape thereto, the casing having an opening for insertion of a liner, and means secured to the outer casing for anchoring a cell in a specified location, including a harness for maintaining the shape of the cell comprising, a circumferential girdle positioned at a point on said cell substantially on a plane intersecting the center of said cell, a plurality of lines extending upwardly from the girdle, a collector ring to which the lines are secured, the ring being positioned adjacent the top of the cell and encompassing the fuel delivery outlet, and a plurality of anchor lines extending downwardly from said girdle.

4. In a submersible fuel cell, an inner imperforate liner having a fuel outlet for fuel delivery therefrom while submerged, a relatively strong outer casing enveloping the liner and imparting shape thereto, and means secured to the outer casing for anchoring a cell in a specified location, including harness means for maintaining the shape of the cell comprising, a circumferential girdle positioned at a point on said cell substantially on a plane intersecting the center of said cell, a plurality of lines extending upwardly from the girdle, a collector ring to which the lines are secured, the collector ring being positioned adjacent the top of the cell and encompassing the fuel delivery outlet, and a plurality of anchor lines extending downwardly from said girdle.

5. In a submersible fuel cell of spherical shape for storing a maximum amount of fuel within a casing of minimum surface area, an inner imperforate liner having a fuel outlet for fuel delivery therefrom while submerged, a relatively strong outer casing enveloping said liner and imparting a spherical shape thereto, said casing having an opening for insertion of a liner therein, a harness for maintaining the spherical shape of the cell comprising, a circumferential girdle, a plurality of lines extending upwardly from said girdle, and a collector ring to which said lines are secured, said ring being positioned adjacent the top of said cell and encompassing the fuel delivery outlet, and anchoring means comprising a plurality of lines and separate anchors for each line secured to said girdle and radially disposed from said cell.

6. A flexible fuel cell for use in submerged refueling stations comprising, a flexible inner liner of a sheet material, an outer enclosure of flexible material, means for maintaining the cell in shape while submerged comprising a plurality of strain relieving lines positioned at a point on said cell substantially on a plane intersecting the center of said cell and outside the cell from the sides to the top of the cell, a combined hoisting and anchoring harness comprising a plurality of lines secured to the outer covering of the cell and extending upwardly and downwardly therefrom, a collector ring secured to the ends of said lines of said cell to which the upwardly extending hoist lines may be secured for raising and lowering said cell and a collector ring located below said cell to which the ends of the downwardly extending lines are secured.

7. A submersible fuel cell comprising, an inner imperforate liner having a fuel outlet for fuel delivery therefrom while anchored in a submerged position, a relatively strong outer casing for imparting shape to said liner and having an opening for insertion of a liner therein, and means secured to the outer casing for anchoring a cell in a specified location for maintaining the shape of the cell comprising a circumferential girdle positioned at a point on said cell substantially on a plane intersecting the center of said cell, a plurality of lines extending upwardly from said girdle, a collector ring to which said lines are secured, said ring being positioned adjacent the top of said cell and encompassing the fuel delivery outlet, and a plurality of anchor lines extending downwardly from said girdle.

HOMER T. BOGLE.

REFERENCES CITED

The following references are of record in the file of this patent:

UNITED STATES PATENTS

| Number | Name | Date |
| --- | --- | --- |
| 211,587 | Raydt | Jan. 21, 1879 |
| 284,667 | Powers | Sept. 11, 1883 |
| 557,396 | Kindt | Mar. 31, 1896 |
| 1,206,747 | Bergeron | Nov. 28, 1916 |
| 1,255,512 | Clements | Feb. 5, 1918 |
| 1,312,356 | Reid | Aug. 5, 1919 |
| 1,384,094 | Saliger | July 12, 1921 |
| 1,448,607 | Tworski | Mar. 13, 1923 |
| 1,844,993 | Tomao | Feb. 16, 1932 |
| 2,000,746 | Dray | May 7, 1935 |
| 2,287,824 | Pihl et al. | June 30, 1942 |

FOREIGN PATENTS

| Number | Country | Date |
| --- | --- | --- |
| 466,985 | Great Britain | June 9, 1937 |